(12) United States Patent
Shabi et al.

(10) Patent No.: US 12,468,466 B2
(45) Date of Patent: Nov. 11, 2025

(54) METHOD TO KEEP ON-DISK PHYSICAL DEDUPLICATION INDEX LAYER UP TO DATE

(71) Applicant: Dell Products L.P., Round Rock, TX (US)

(72) Inventors: Uri Shabi, Tel Mond (IL); Alexander Shknevsky, Fair Lawn, NJ (US); Amit Zaitman, Shavey Shomron (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/638,979

(22) Filed: Apr. 18, 2024

(65) Prior Publication Data

US 2025/0328271 A1 Oct. 23, 2025

(51) Int. Cl.
*G06F 3/00* (2006.01)
*G06F 3/06* (2006.01)

(52) U.S. Cl.
CPC .......... *G06F 3/0641* (2013.01); *G06F 3/0604* (2013.01); *G06F 3/067* (2013.01)

(58) Field of Classification Search
CPC ....... G06F 3/0641; G06F 3/0604; G06F 3/067
See application file for complete search history.

(56) References Cited

U.S. PATENT DOCUMENTS

| | | | |
|---|---|---|---|
| 7,567,188 B1 * | 7/2009 | Anglin | H03M 7/3084 341/63 |
| 11,151,056 B2 | 10/2021 | Shveidel et al. | |
| 11,314,705 B2 | 4/2022 | Gazit et al. | |
| 11,423,010 B2 | 8/2022 | Harel et al. | |
| 11,593,327 B2 | 2/2023 | Dalmatov | |
| 11,720,484 B2 | 8/2023 | Harel et al. | |
| 11,748,015 B2 | 9/2023 | Shabi et al. | |
| 11,829,249 B2 | 11/2023 | Zou et al. | |
| 2011/0145207 A1 * | 6/2011 | Agrawal | G06F 16/1748 707/E17.002 |
| 2011/0307683 A1 * | 12/2011 | Spackman | G06F 16/1748 711/216 |
| 2021/0034249 A1 * | 2/2021 | Armangau | G06F 3/0659 |

* cited by examiner

*Primary Examiner* — Craig S Goldschmidt
(74) *Attorney, Agent, or Firm* — BainwoodHuang

(57) ABSTRACT

Techniques for keeping on-disk, physical deduplication ("dedupe") index levels up to date to increase the efficiency of data deduplication in storage systems. The techniques include providing a plurality of dedupe indexes across a memory level and a disk level of a storage system, in which the plurality of dedupe indexes include an in-memory dedupe index at the memory level, and an on-disk dedupe index at the disk level. The techniques include applying a plurality of eviction rules regarding evicting entries of the on-disk dedupe index, in which the plurality of eviction rules avoid random evictions of entries from the on-disk dedupe index. The techniques include, in response to applying the plurality of eviction rules, identifying a plurality of entries of the on-disk dedupe index as eviction candidates. The techniques include evicting the identified eviction candidates from the on-disk dedupe index.

18 Claims, 5 Drawing Sheets

Namespace layer 118

Virtualization layer 122

Physical layer 124

METHOD TO KEEP ON-DISK PHYSICAL DEDUPLICATION INDEX LAYER UP TO DATE

BACKGROUND

Storage systems include storage processors coupled to arrays of storage devices ("storage arrays"), such as solid state drives (SSDs) and/or hard disk drives (HDDs). The storage processors receive and service storage input/output (IO) requests (e.g., write requests, read requests) from storage client computers ("storage clients"), which send the storage IO requests to the storage systems over one or more networks. The storage IO requests specify datasets, including data blocks, data pages, data files, or other data elements, to be written to or read from logical units (LUs), volumes (VOLs), filesystems, or other storage objects maintained on the storage devices. The storage systems perform data reduction techniques, including data deduplication ("dedupe") techniques. The storage systems maintain dedupe indexes that associate digests (e.g., hash values) of datasets with pointers to locations where the datasets are stored. In response to receiving write requests specifying new datasets to be written to storage objects, the storage processors apply hash functions to the new datasets to obtain hash values, and perform lookups into the dedupe indexes to identify hash value entries for stored datasets that match the hash values. Upon identifying matching hash value entries, the storage processors effectuate storage of the new datasets using pointers to locations of the stored datasets, avoiding redundant storage of duplicate datasets in the storage systems.

SUMMARY

Storage systems that perform data dedupe techniques can maintain dedupe indexes across several memory/storage levels, including at least one volatile ("in-memory") level and at least one persistent ("on-disk") level. Once a dedupe index at an in-memory level ("in-memory dedupe index") reaches a specified fullness threshold, a storage system can destage "dirty" hash value entries (i.e., hash value entries not persisted at an on-disk level) from the in-memory dedupe index to a dedupe index at the on-disk level ("on-disk dedupe index"). The storage system can delete the destaged hash value entries from the in-memory dedupe index, and merge them with hash value entries of the on-disk dedupe index. Having destaged the dirty hash value entries to the on-disk dedupe index, the storage system can mark the destaged hash value entries as "clean." If new hash value entries arrive before the dirty hash value entries are destaged to the on-disk dedupe index, then the storage system can apply an eviction policy, such as an LRU (Least Recently Used) policy or an LFU (Least Frequently Used) policy, to remove or evict certain hash value entries from the in-memory dedupe index so as to make space for the new hash value entries. If the destaging of hash value entries results in too many hash value entries in the on-disk dedupe index, then the storage system can apply a removal or eviction policy at the on-disk level. However, because random eviction policies are typically applied at the on-disk level, some hash value entries for highly deduplicable datasets may be evicted from the on-disk dedupe index, reducing the efficiency of data deduplication in the storage system.

Techniques are disclosed herein for keeping on-disk, physical dedupe index levels up to date to increase the efficiency of data deduplication in storage systems. A storage system that performs the disclosed techniques can maintain dedupe indexes across several memory/storage levels, including at least one in-memory level and at least one on-disk level. The storage system can implement a namespace layer, a physical layer, and multiple layers of indirection for accessing stored datasets in the physical layer. The multiple layers of indirection can include a mapping layer that maintains a plurality of leaf pointers, and a virtualization layer that maintains a plurality of virtual data structures. Each leaf pointer is configured to point to a virtual data structure. Each virtual data structure can contain virtualization information, including at least a pointer ("virtual pointer") configured to point to a location of a stored dataset in the physical layer, and a reference count for keeping track of the number of leaf pointers that point to the virtual data structure. Once an in-memory dedupe index reaches a specified fullness threshold, the storage system can destage "dirty" hash value entries from the in-memory dedupe index to the on-disk dedupe index. The storage system can merge the destaged hash value entries with hash value entries of the on-disk dedupe index, delete the destaged hash value entries from the in-memory dedupe index, and mark the destaged hash value entries as "clean."

Destaging hash value entries from the in-memory dedupe index can sometimes result in too many hash value entries in the on-disk dedupe index. It is noted that destaging hash value entries of dedupe indexes between on-disk levels can also result in too many hash value entries in an on-disk dedupe index. In the disclosed techniques, the storage system can avoid random evictions of hash value entries from the on-disk dedupe index by applying specialized eviction rules for the on-disk dedupe index. In one embodiment, the storage system can apply up to at least four (4) specialized eviction rules, namely, (i) a first eviction rule that includes avoiding removing or evicting hash value entries for datasets pointed to by virtual pointers with reference counts having a predetermined "infinite" value ("infinite reference count"), (ii) a second eviction rule that includes preferring removing or evicting hash value entries for datasets pointed to by virtual pointers with reference counts reaching a predetermined "maximum" value ("maximum reference count") less than the infinite reference count, (iii) a third eviction rule that includes preferring removing or evicting hash value entries for datasets deemed to be non-deduplicable (or "unique"), and (iv) a fourth eviction rule that includes avoiding removing or evicting "clean" hash value entries previously destaged from the in-memory dedupe index.

The storage system can perform the disclosed techniques to assure space will be available in the on-disk dedupe index to accommodate any hash value entries destaged from the in-memory dedupe index. The disclosed techniques can include applying the first eviction rule (i.e., avoiding deleting or evicting hash value entries for datasets pointed to by virtual pointers with the infinite reference count) and/or the fourth eviction rule (i.e., avoiding deleting or evicting "clean" hash value entries previously destaged from the in-memory dedupe index). The disclosed techniques can include identifying hash value entries as candidates for eviction ("eviction candidates") based on the second eviction rule (i.e., hash value entries for datasets pointed to by virtual pointers with the maximum reference count) and/or the third eviction rule (i.e., hash value entries for unique datasets). The disclosed techniques can include, if the number of identified eviction candidates is less than a target number of eviction candidates, randomly identifying, as a last resort, one or more additional hash value entries of the on-disk dedupe index as eviction candidates so as to obtain the target number of eviction candidates. The disclosed techniques can include removing or evicting the identified eviction candidates from the on-disk dedupe index.

In certain embodiments, a method includes providing a plurality of deduplication ("dedupe") indexes across a memory level and a disk level of a storage system. The plurality of dedupe indexes include an in-memory dedupe index at the memory level, and an on-disk dedupe index at the disk level. The plurality of dedupe indexes are used by the storage system in performing data deduplication operations. The method includes applying a plurality of eviction rules regarding evicting digest entries of the on-disk dedupe index. The plurality of eviction rules avoid random evictions of digest entries from the on-disk dedupe index. The method includes, in response to applying the plurality of eviction rules, identifying a number of digest entries of the on-disk dedupe index as eviction candidates, and evicting the identified eviction candidates from the on-disk dedupe index.

In certain arrangements, each of the plurality of dedupe indexes includes a plurality of digest entries. Each digest entry includes a digest of a stored dataset and a pointer to information pertaining to a location of the stored dataset. The method includes applying a first eviction rule including avoiding removing or evicting digest entries for stored datasets pointed to by virtual pointers having an infinite reference count, applying a second eviction rule including preferring removing or evicting digest entries for stored datasets pointed to by virtual pointers having a maximum reference count less than the infinite reference count, applying a third eviction rule including preferring removing or evicting digest entries for stored datasets deemed non-deduplicable, and applying a fourth eviction rule including avoiding removing or evicting "clean" digest entries previously destaged from the in-memory dedupe index.

In certain arrangements, the method includes, in response to a reference count of a virtual pointer being updated to the infinite reference count from a value less than the infinite reference count, adding a corresponding "dirty" digest entry to the in-memory dedupe index. The corresponding dirty digest entry was not previously destaged to the on-disk dedupe index.

In certain arrangements, the method includes preferring removing or evicting, from the in-memory dedupe index, digest entries for stored datasets pointed to by virtual pointers having the maximum reference count less than the infinite reference count.

In certain arrangements, the method includes logging updates to digest entries of the in-memory dedupe index in a dedupe log, and preferring removing or evicting, from the on-disk dedupe index, digest entries for stored datasets pointed to by virtual pointers having the maximum reference count, using the logged updates in the dedupe log.

In certain arrangements, each digest entry includes a binary indication of whether the stored dataset is deduplicable or non-deduplicable. The method includes determining that a stored dataset is deemed non-deduplicable based on the binary indication.

In certain arrangements, the method includes avoiding destaging the stored dataset deemed non-deduplicable to the on-disk dedupe index.

In certain arrangements, the method includes determining that a corresponding digest entry is a clean digest entry previously destaged to the on-disk dedupe index, and avoiding updating the binary indication of the clean digest entry.

In certain arrangements, the method includes determining a target number of the eviction candidates based on one or more of a maximum number of digest entries that the on-disk dedupe index can accommodate, a current number of digest entries in the on-disk dedupe index, a number of digest entries to be destaged from the in-memory dedupe index, and a number of digest entries for datasets pointed to by virtual pointers whose reference counts have been updated.

In certain arrangements, the method includes determining that the number of digest entries of the on-disk dedupe index identified as eviction candidates does not meet the target number of the eviction candidates, and repeating applying at least the second eviction rule and the third eviction rule.

In certain arrangements, the method includes determining that the number of digest entries of the on-disk dedupe index identified as eviction candidates meets the target number of the eviction candidates, and, having evicted the identified eviction candidates from the on-disk dedupe index, destaging digest entries from the in-memory dedupe index to the on-disk dedupe index.

In certain embodiments, a system includes a memory, and processing circuitry configured to execute program instructions out of the memory to provide a plurality of dedupe indexes across a memory level and a disk level of the system. The plurality of dedupe indexes include an in-memory dedupe index at the memory level, and an on-disk dedupe index at the disk level. The plurality of dedupe indexes are used in performing data deduplication operations. The processing circuitry is configured to execute the program instructions out of the memory to apply a plurality of eviction rules regarding evicting digest entries of the on-disk dedupe index. The plurality of eviction rules avoid random evictions of digest entries from the on-disk dedupe index. The processing circuitry is configured to execute the program instructions out of the memory, in response to applying the plurality of eviction rules, to identify a number of digest entries of the on-disk dedupe index as eviction candidates, and evict the identified eviction candidates from the on-disk dedupe index.

In certain arrangements, each of the plurality of dedupe indexes includes a plurality of digest entries. Each digest entry includes a digest of a stored dataset and a pointer to information pertaining to a location of the stored dataset. The processing circuitry is configured to execute the program instructions out of the memory to apply a first eviction rule including avoiding removing or evicting digest entries for stored datasets pointed to by virtual pointers having an infinite reference count, apply a second eviction rule including preferring removing or evicting digest entries for stored datasets pointed to by virtual pointers having a maximum reference count less than the infinite reference count, apply a third eviction rule including preferring removing or evicting digest entries for stored datasets deemed non-deduplicable, and apply a fourth eviction rule including avoiding removing or evicting clean digest entries previously destaged from the in-memory dedupe index.

In certain arrangements, the processing circuitry is configured to execute the program instructions out of the memory, in response to a reference count of a virtual pointer being updated to the infinite reference count from a value less than the infinite reference count, to add a corresponding dirty digest entry to the in-memory dedupe index. The corresponding dirty digest entry was not previously destaged to the on-disk dedupe index.

In certain arrangements, the processing circuitry is configured to execute the program instructions out of the memory to prefer removing or evicting, from the in-memory dedupe index, digest entries for stored datasets pointed to by virtual pointers having the maximum reference count less than the infinite reference count.

In certain arrangements, the processing circuitry is configured to execute the program instructions out of the memory to log updates to digest entries of the in-memory dedupe index in a dedupe log, and prefer removing or evicting, from the on-disk dedupe index, digest entries for stored datasets pointed to by virtual pointers having the maximum reference count, using the logged updates in the dedupe log.

In certain arrangements, each digest entry includes a binary indication of whether the stored dataset is deduplicable or non-deduplicable. The processing circuitry is configured to execute the program instructions out of the memory to determine that a stored dataset is deemed non-deduplicable based on the binary indication.

In certain arrangements, the processing circuitry is configured to execute the program instructions out of the memory to avoid destaging the stored dataset deemed non-deduplicable to the on-disk dedupe index.

In certain arrangements, the processing circuitry is configured to execute the program instructions out of the memory to determine that a corresponding digest entry is a clean digest entry previously destaged to the on-disk dedupe index, and avoid updating the binary indication of the clean digest entry.

In certain embodiments, a computer program product includes a set of non-transitory, computer-readable media having instructions that, when executed by processing circuitry, cause the processing circuitry to perform a method including providing a plurality of dedupe indexes across a memory level and a disk level of a storage system. The plurality of dedupe indexes include an in-memory dedupe index at the memory level, and an on-disk dedupe index at the disk level. The plurality of dedupe indexes are used by the storage system in performing data deduplication operations. The method includes applying a plurality of eviction rules regarding evicting digest entries of the on-disk dedupe index. The plurality of eviction rules avoid random evictions of digest entries from the on-disk dedupe index. The method includes, in response to applying the plurality of eviction rules, identifying a number of digest entries of the on-disk dedupe index as eviction candidates, and evicting the identified eviction candidates from the on-disk dedupe index.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for keeping on-disk, physical deduplication ("dedupe") index levels up to date to increase the efficiency of data deduplication in storage systems. The disclosed techniques can include providing a plurality of dedupe indexes across a memory level and a disk level of a storage system, in which the plurality of dedupe indexes include an in-memory dedupe index at the memory level, and an on-disk dedupe index at the disk level. The disclosed techniques can include applying a plurality of eviction rules regarding evicting entries of the on-disk dedupe index, in which the plurality of eviction rules avoid random evictions of entries from the on-disk dedupe index. The disclosed techniques can include, in response to applying the plurality of eviction rules, identifying a plurality of entries of the on-disk dedupe index as eviction candidates. The disclosed techniques can include evicting the identified eviction candidates from the on-disk dedupe index.

Figure 1:
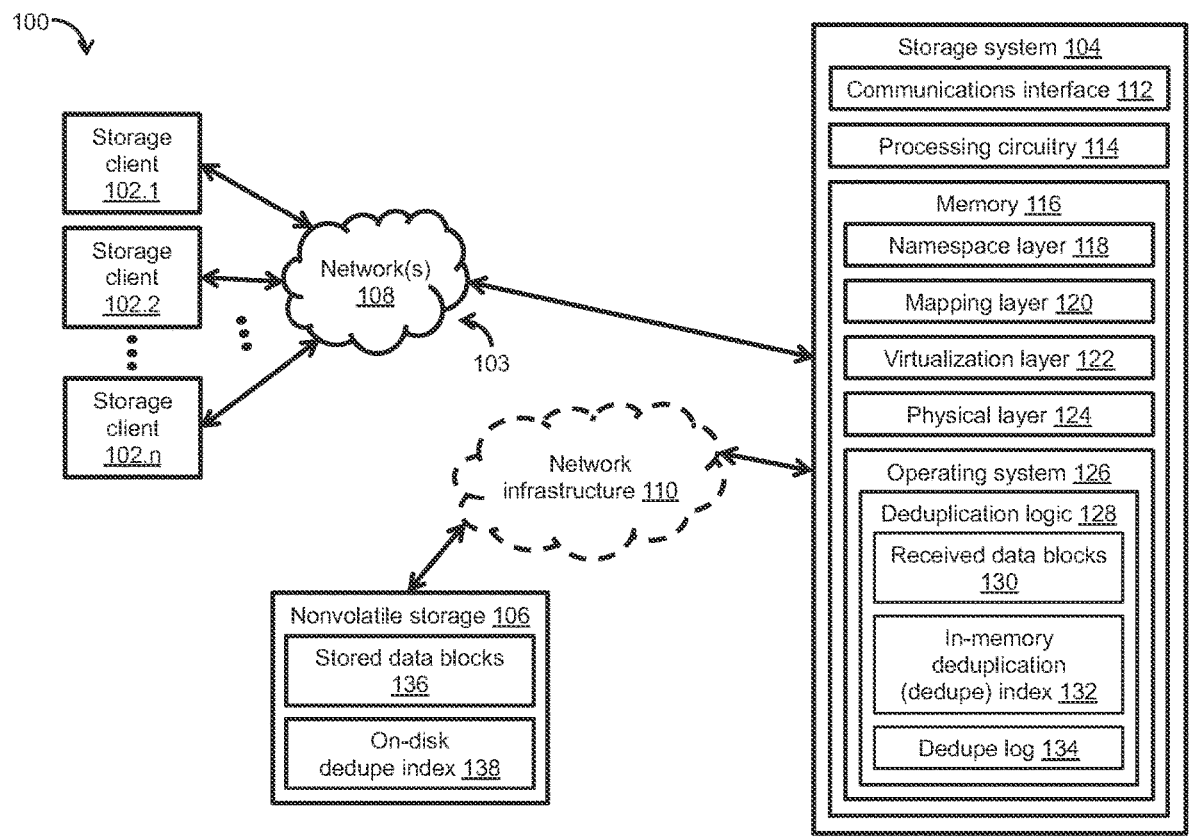
FIG. 1 is a block diagram of an exemplary storage environment, in which techniques can be practiced for keeping on-disk, physical deduplication ("dedupe") index levels up to date to increase the efficiency of data deduplication in a storage system.

FIG. 1 depicts an illustrative embodiment of an exemplary storage environment 100, in which techniques can be practiced for keeping on-disk, physical dedupe index levels up to date to increase the efficiency of data deduplication in storage systems. As shown in FIG. 1, the storage environment 100 can include a plurality of storage client computers ("storage clients") 102.1, 102.2, . . . , 102.n, a storage system 104, a nonvolatile storage 106, and a communications medium 103 including at least one network 108. Each storage client 102.1, . . . , 102.n can provide, over the network(s) 108, storage input/output (IO) requests (e.g., small computer system interface (SCSI) commands, network file system (NFS) commands) to the storage system 104. Such storage IO requests (e.g., write requests, read requests) can direct the storage system 104 to write and/or read datasets including data blocks, data pages, data files, or any other suitable data elements, to/from logical units (LUs), volumes (VOLs), virtual volumes (VVOLs) (e.g., VMware® VVOLs), filesystems, or any other suitable storage objects, maintained on storage devices (e.g., solid state drives (SSDs), flash drives, hard disk drives (HDDs)) of the nonvolatile storage 106.

The communications medium 103 can be configured to interconnect the plurality of storage clients 102.1, . . . , 102.n with the storage system 104 to enable them to communicate and exchange data and/or control signaling. As shown in FIG. 1, the communications medium 103 can be illustrated as a "cloud" to represent different network topologies, such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based communications devices and cabling, fiber optic devices and cabling, wireless devices, and so on, or any suitable combination thereof.

The storage system 104 can be connected either directly to the nonvolatile storage 106 or indirectly through an optional network infrastructure 110. The network infrastructure 110 can include an Ethernet network, an InfiniBand network, a fiber channel (FC) network, or any other suitable network. As shown in FIG. 1, the storage system 104 can include a communications interface 112, processing circuitry 114, and a memory 116. The communications interface 112 can include an Ethernet interface, an InfiniBand interface, an FC interface, or any other suitable communications interface. The communications interface 112 can further include SCSI target adapters, network interface adapters, or any other suitable adapters, for converting electronic, optical, or wireless signals received over the network(s) 108 to a form suitable for use by the processing circuitry 114. The processing circuitry 114 (e.g., central processing unit (CPU)) can include a set of processing cores (e.g., CPU cores) configured to execute specialized code, modules, and/or logic as program instructions out of the memory 116, process storage IO requests (e.g., write requests, read requests) issued by the storage clients 102.1, ..., 102.$n$, and store datasets in the storage devices of the nonvolatile storage 106 within the storage environment 100, which can be a RAID (Redundant Array of Independent Disks) environment.

The memory 116 can include volatile memory such as random access memory (RAM) or any other suitable volatile memory, and nonvolatile memory such as nonvolatile RAM (NVRAM) or any other suitable nonvolatile memory. The memory 116 can accommodate a variety of specialized software constructs, including a namespace layer 118, a mapping layer 120, a virtualization layer 122, and a physical layer 124. The memory 116 can also accommodate an operating system (OS) 126, such as a Linux OS, Unix OS, Windows OS, or any other suitable OS, as well as specialized software code, modules, and/or logic, including dedupe logic 128 that can operate on received data blocks 130 in association with an in-memory dedupe index 132 and a dedupe log 134. The nonvolatile storage 106 can maintain stored data blocks 136 and an on-disk dedupe index 138 on one or more storage devices (e.g., SSDs, HDDs).

The namespace layer 118 can be configured as a logical structure for organizing storage objects accessible to the plurality of storage clients 102.1, ..., 102.$n$, such as LUs, VOLs, VVOLs, filesystems, or any other suitable storage objects. The namespace layer 118 can track logical addresses of storage objects, including offsets into LUs or file system addresses. For example, if an LU has a maximum size of 10 gigabytes (GB), then the namespace layer 125 may provide a 10 GB logical address range to accommodate the LU. The mapping layer 120 can be configured as a logical structure for mapping logical addresses of storage objects in the namespace layer 118 to virtual data structures in the virtualization layer 122. The mapping layer 120 can include a plurality of pointer arrays arranged as multi-level tree data structures (e.g., b-trees), a lowest level of which can include a plurality of leaf pointers.

The virtualization layer 122 can be configured as a logical structure for providing block virtualization in support of data deduplication. The virtualization layer 122 can include an aggregation of virtual layer blocks (VLBs), each of which can include a plurality of virtual data structures. Each virtual data structure can contain virtualization information, including a pointer ("virtual pointer") configured to point to a location of a dataset (e.g., data block) in the physical layer 124, and a reference count for keeping track of a number of leaf pointers that point to the virtual data structure. The physical layer 124 can be configured as a logical structure for storing an aggregation of physical layer blocks (PLBs), each of which can accommodate a plurality of uncompressed/compressed datasets (e.g., data blocks). Each virtual pointer can point to a dataset in a PLB of the physical layer 124. It is noted that, although the physical layer 124 is described herein using the term "physical," an underlying storage device is responsible for the actual physical storage of client data.

FIGS. 2$a$, 2$b$, and 2$c$ depict the namespace layer 118, the virtualization layer 122, and the physical layer 124, respectively, which can be implemented by the storage system 104 of FIG. 1. The namespace layer 118 (see FIG. 2$a$) can organize a plurality of LUs, such as an LU 202.0, an LU 202.1, and so on, up to at least an LU 202.$m$. The namespace 118 can track logical addresses of the LUs 202.0, ..., 202.$m$, ..., such as logical addresses 204.0 for the LU 202.0, logical addresses 204.1 for the LU 202.1, and so on, up to at least logical addresses 204.$m$ for the LU 202.$m$. The virtualization layer 122 (see FIG. 2$b$) can include an aggregation of VLBs, such as a VLB 206.0, a VLB 206.1, and so on, up to at least a VLB 206.$p$. Each VLB 206.0, ..., 206.$p$, ... can have an associated logical index, such as a logical index "0" for the VLB 206.0, a logical index "1" for the VLB 206.1, and so on, up to at least a logical index "p" for the VLB 206.$p$. The physical layer 124 can store an aggregation of PLBs, such as a PLB 208.0, a PLB 208.1, and so on, up to at least a PLB 208.$q$. Each PLB 208.0, ..., 208.$q$, ... can have an associated PLB reference, such as a PLB reference "0" for the PLB 208.0, a PLB reference "1" for the PLB 208.1, and so on, up to at least a PLB reference "q" for the PLB 208.$q$. In addition, each PLB 208.0, ..., 208.$q$, ... can include a dataset (e.g., data block(s)), such as data block(s) 210.0 for the PLB 208.0, data block(s) 210.1 for the PLB 208.1, and so on, up to at least data block(s) 210.$q$ for the PLB 208.$q$.

FIG. 2$d$ depicts multiple layers of indirection provided by the mapping layer 120 and the virtualization layer 122, with reference to the namespace layer 118 and the physical layer 124. As shown in FIG. 2$d$, the namespace layer 118 includes the LU 202.0, which can have a logical address 204.00, a logical address 204.01, a logical address 204.02, ..., and so on, up to at least a logical address 204.0$m$, associated therewith. For example, the logical addresses 204.00, 204.01, ..., 204.0$m$, ... may correspond to contiguous offsets into the LU 202.0. The virtualization layer 122 includes the VLB 206.0, which corresponds to the logical index "0." The VLB 206.0 can include a virtual data structure ("virtual") 216.0, a virtual 216.1, and so on, up to at least a virtual 216.$s$. The mapping layer 120 can include a pointer array 212.0, a pointer array 212.1, a pointer array 212.2, and so on, up to at least a pointer array 212.$r$. The pointer array 212.0 can include a leaf pointer 214.0, the pointer array 212.1 can include a leaf pointer 214.1, the pointer array 212.2 can include a leaf pointer 214.2, and so on, up to at least the pointer array 212.$r$, which can include a leaf pointer 214.$r$. The mapping layer 120 can map the logical addresses 204.00, ..., 204.0$m$, ... of the LU 202.0 to the virtuals 216.0, ..., 216.$s$, ... of the VLB 206.0. For example, the leaf pointer 214.0 may point to the virtual 216.0, the leaf pointer 214.1 may also point to the virtual 216.0, the leaf pointer 214.2 may point to the virtual 216.1, and so on, up to at least the leaf pointer 214.$r$, which may point to the virtual 216.*s*. The physical layer 124 includes the PLB 208.0, which corresponds to the PLB reference "0." The PLB 208.0 can include a data block 210.00, a data block 210.01, and so on, up to at least a data block 210.0*t*.

Figure 2A:
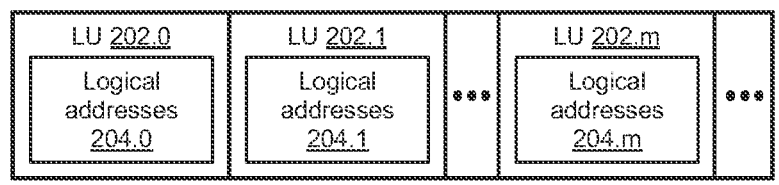
FIG. 2a is a block diagram of an exemplary namespace layer that can be implemented in the storage system of FIG. 1.
Figure 2B:
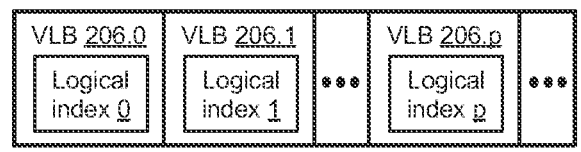
FIG. 2b is a block diagram of an exemplary virtualization layer that can be implemented in the storage system of FIG. 1.
Figure 2C:
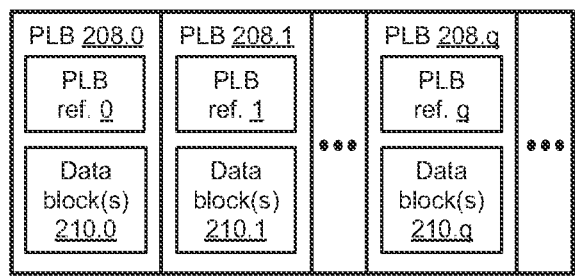
FIG. 2c is a block diagram of an exemplary physical layer that can be implemented in the storage system of FIG. 1.
Figure 2D:
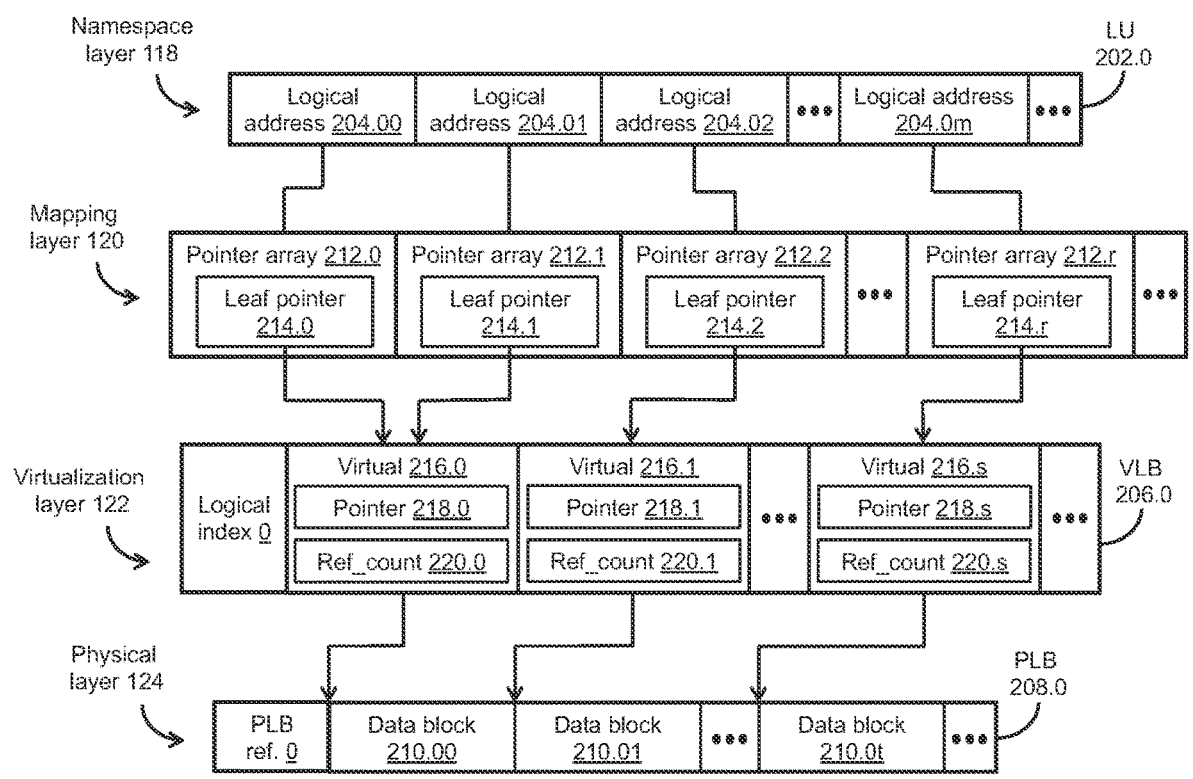
FIG. 2d is a block diagram of the namespace layer, the virtualization layer, and the physical layer of FIGS. 2a, 2b, and 2c, respectively, as well as exemplary layers of indirection that can be implemented in the storage system of FIG. 1, in which the layers of indirection include an exemplary mapping layer and an exemplary virtualization layer for accessing stored datasets in the physical layer.

As described herein, the virtualization layer 122 can be configured to provide block virtualization in support of data deduplication. Such block virtualization is illustrated by the logical addresses 204.00, 204.01 of the LU 202.0 being mapped, by the mapping layer 120, to the same virtual 216.0 of the VLB 206.0, indicating that the logical addresses 204.00, 204.01 correspond to a deduplicable data block, namely, the data block 210.00. As shown in FIG. 2*d*, the logical address 204.02 of the LU 202.0 is mapped, by the mapping layer 120, to the virtual 216.1 of the VLB 206.0, indicating that the logical address 204.02 may correspond to a non-deduplicable (or "unique") data block, namely, the data block 210.01. Further, the logical address 204.0*m* of the LU 202.0 is mapped, by the mapping layer 120, to the virtual 216.*s* of the VLB 206.0, indicating that the logical address 204.0*m* may also correspond to a non-deduplicable (or "unique") data block, namely, the data block 210.0*t*.

To support data deduplication, the virtual 216.0 can contain virtualization information, including at least a pointer ("virtual pointer") 218.0, and a reference count ("Ref_count") 220.0 that keeps track of the number of leaf pointers 214.0, . . . , 214.*r* pointing to the virtual 216.0. As illustrated in FIG. 2*d*, the virtual pointer 218.0 can be configured to point to a location of the data block 210.00 in the PLB 208.0. Further, because the two (2) leaf pointers 214.0, 214.1 point to the same virtual 216.0, the Ref_count 220.0 can be equal to "2." Likewise, the virtual 216.1 can contain virtualization information, including at least a pointer ("virtual pointer") 218.1, and a reference count ("Ref_count") 220.1 that keeps track of the number of leaf pointers 214.0, . . . , 214.*r* pointing to the virtual 216.1. As illustrated in FIG. 2*d*, the virtual pointer 218.1 can be configured to point to a location of the data block 210.01 in the PLB 208.0. Further, because only the leaf pointer 214.2 points to the virtual 216.1, the Ref_count 220.1 can be equal to "1." In addition, the virtual 216.*s* can contain virtualization information, including at least a pointer ("virtual pointer") 218.*s*, and a reference count ("Ref_count") 220.*s* that keeps track of the number of leaf pointers 214.0, . . . , 214.*r* pointing to the virtual 216.*s*. As illustrated in FIG. 2*d*, the virtual pointer 218.*s* can be configured to point to a location of the data block 210.0*t* in the PLB 208.0. Further, because only the leaf pointer 214.*r* points to the virtual 216.*s*, the Ref_count 220.*s* can be equal to "1."

Figure 3:
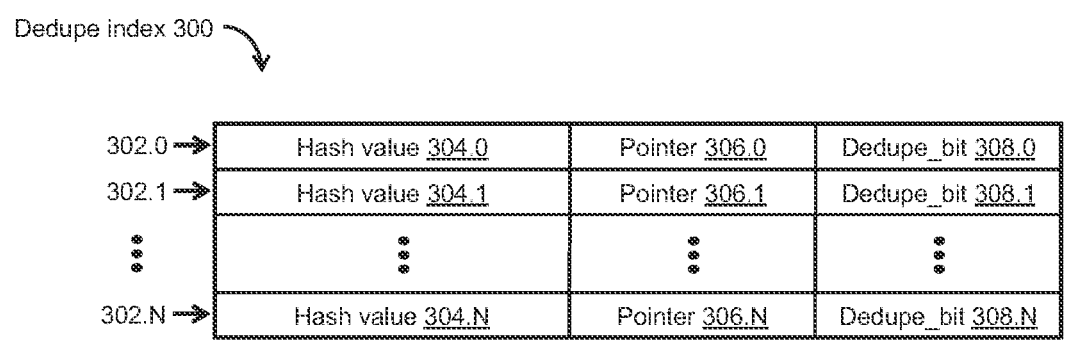
FIG. 3 is a diagram of an exemplary dedupe index that can be implemented in the storage system of FIG. 1.

FIG. 3 depicts an exemplary dedupe index 300 that can be used to perform the techniques disclosed herein. It is noted that each of the in-memory dedupe index 132 and the on-disk dedupe index 138 can be implemented like the dedupe index 300. As shown in FIG. 3, the dedupe index 300 can include a plurality of digest entries 302.0, 302.1, and so on, up to a digest entry 302.N, in which "N" can correspond to a maximum number of digest entries that may be contained in the dedupe index 300. Each digest entry 302.0, . . . , 302.N can include a digest (e.g., hash value; SHA-1) of a previously stored dataset (e.g., data block), a pointer to virtualization information (e.g., virtual pointer, reference count) pertaining to the stored dataset, and a specialized deduplication bit ("Dedupe_bit") that provides a binary indication (0, 1) of whether the stored dataset is non-deduplicable (or "unique") or deduplicable. The digest entry 302.0 can include a hash value 304.0, a pointer 306.0, and a Dedupe_bit 308.0, the digest entry 302.1 can include a hash value 304.1, a pointer 306.1, and a Dedupe_bit 308.1, and so on, up to the digest entry 302.N, which can include a hash value 304.N, a pointer 306.N, and a Dedupe_bit 308.N. When virtualization information (e.g., reference count) and/or a deduplication bit corresponding to a digest entry of the dedupe index 300 are updated, the storage system 104 can log the updates in the dedupe log 134, in association with a unique sequence identifier (ID).

During operation, the storage system 104 can maintain the in-memory dedupe index 132 at the in-memory level, and maintain the on-disk dedupe index 138 at the on-disk level. Once the in-memory dedupe index 132 reaches a specified fullness threshold, the storage system 104 can destage "dirty" digest entries from the in-memory dedupe index 132 to the on-disk dedupe index 138, and merge the destaged digest entries with digest entries of the on-disk dedupe index 138. The storage system 104 can delete the destaged digest entries from the in-memory dedupe index 132, and mark the digest entries destaged to the on-disk dedupe index 138 as "clean."

Unfortunately, however, destaging digest entries from the in-memory dedupe index 132 can sometimes result in too many digest entries in the on-disk dedupe index 138. It is noted that destaging digest entries of dedupe indexes between on-disk levels can also result in too many digest entries in an on-disk dedupe index. For example, the number of digest entries in the on-disk dedupe index 138 may reach the maximum number of digest entries, N (see FIG. 3). In the disclosed techniques, the storage system 104 can avoid random evictions of digest entries from the on-disk dedupe index 138 by applying specialized eviction rules for the on-disk dedupe index. In one embodiment, the storage system 104 can apply up to at least four (4) specialized eviction rules, namely, (i) a first eviction rule that includes avoiding removing or evicting digest entries for datasets pointed to by virtual pointers with reference counts having a predetermined "infinite" value ("infinite reference count"), (ii) a second eviction rule that includes preferring removing or evicting digest entries for datasets pointed to by virtual pointers with reference counts reaching a predetermined "maximum" value ("maximum reference count") less than the infinite reference count, (iii) a third eviction rule that includes preferring removing or evicting digest entries for datasets deemed to be non-deduplicable (or "unique"), and (iv) a fourth eviction rule that includes avoiding removing or evicting "clean" digest entries previously destaged from the in-memory dedupe index. If, having applied some or all of the specialized eviction rules, the storage system 104 determines that the number of digest entries to be removed or evicted from the on-disk dedupe index is less than a target number of digest entries, then the storage system 104 can, as a last resort, randomly select one or more additional digest entries so as to obtain the target number of digest entries. The disclosed techniques can include removing or evicting the target number of digest entries from the on-disk dedupe index.

The disclosed techniques for keeping on-disk, physical dedupe index levels up to date to increase the efficiency of data deduplication in storage systems will be further understood with reference to the following illustrative example. In this example, the storage system 104 (see FIG. 1) applies the four (4) eviction rules described herein to avoid random evictions of digest entries from the on-disk dedupe index 138. As described herein, the first eviction rule includes avoiding removing or evicting digest entries for datasets pointed to by virtual pointers with an infinite reference count, and the second eviction rule includes preferring removing or evicting digest entries for datasets pointed to by virtual pointers with a maximum reference count less than the infinite reference count. In one embodiment, the maximum reference count can be equal to 1, 10, 100, 1,000, 10,000, or any other suitable value. Further, the infinite reference count can correspond to a value greater than the maximum reference count, such as greater than 10,000 or any other suitable value.

In this example, regarding the first eviction rule, when a dataset is pointed to by a virtual pointer with an infinite reference count, it is assumed that the storage system 104 is no longer capable of accurately tracking the reference count for a corresponding virtual. For this reason, the storage system 104 no longer updates (i.e., increases, decreases) the reference count for the corresponding virtual. Such a virtual with an infinite reference count is deemed to be highly deduplicable, and is allowed to remain in the storage system 104 indefinitely as a valid deduplicating target. In one embodiment, to assure good amortization when destaging to the on-disk dedupe index while avoiding write amplification, the storage system 104 can add a dirty digest entry to the in-memory dedupe index 132 each time a reference count for a virtual is updated to an infinite reference count, from a value less than the infinite reference count. It is noted that such an update of a reference count can occur just once for each entry of the in-memory dedupe index 132. It is further noted, however, that allowing virtuals with infinite reference counts to remain in the storage system 104 indefinitely can sometimes be problematic, because it can limit the amount of free space available in the on-disk dedupe index for new digest entries.

To address this problem, the storage system 104 applies the second eviction rule to remove or evict digest entries for datasets pointed to by virtual pointers with a maximum reference count less than the infinite reference count. In this way, at least some digest entries can be removed or evicted from the on-disk dedupe index before the reference counts for corresponding virtuals reach the infinite reference count. In one embodiment, if such digest entries are present in the in-memory dedupe index, then the storage system 104 can remove or evict them from the in-memory dedupe index. If such digest entries are not present in the in-memory dedupe index, but are present in the on-disk dedupe index, then the storage system 104 can remove or evict them from the on-disk dedupe index, using updates related to the digest entries logged in the dedupe log 134.

In this example, to increase the amount of free space available in the on-disk dedupe index for new digest entries, the storage system 104 applies the third eviction rule to remove or evict digest entries for datasets deemed to be non-deduplicable (or "unique"). As described herein, with reference to FIG. 3, each digest entry 302.0, . . . , 302.N of the dedupe index 300 can include a specialized deduplication bit ("Dedupe_bit") that provides a binary indication (0, 1) of whether a stored dataset (e.g., data block) is non-deduplicable ("unique") or deduplicable. In one embodiment, upon receipt of a first data block from among the received data blocks 130, the storage system 104 can apply a hash function to the first data block to obtain a hash value, and perform a lookup first into the in-memory dedupe index 132, and, if necessary, into the on-disk dedupe index 138, to identify a digest entry for one of the stored data blocks 136 that matches the hash value of the first data block. If a matching digest entry is not identified, then the storage system 104 can add a dirty digest entry for the first data block to the in-memory dedupe index 132, and set the Dedupe_bit for the dirty digest entry to "0," indicating that the first data block is currently deemed to be non-deduplicable ("unique"). If, upon receipt of a second data block from among the received data blocks 130, the storage system 104 performs a lookup into the in-memory dedupe index 132 and identifies the dirty digest entry for the first data block as matching a hash value of the second data block, then the storage system 104 can update the dirty digest entry for the first data block, and set the Dedupe_bit for the dirty digest entry to "1," indicating that the first data block is now deemed to be deduplicable. However, if the dirty digest entry for the first data block is not identified as matching the hash value of the second data block, then its Dedupe_bit can remain set to "0." Once the in-memory dedupe index 132 reaches a specified fullness threshold, the storage system 104 can check the Dedupe_bit of the dirty digest entry for the first data block, determine that it is set to "0" (indicating that the first data block is unique), and avoid destaging the dirty digest entry from the in-memory dedupe index 132 to the on-disk dedupe index 138. The storage system 104 can also flag the dirty digest entry for the unique first data block as a candidate for eviction ("eviction candidate"). In this embodiment, it is assumed that an interval between destage operations is long enough to allow the storage system 104 to flag the dirty digest entry for the unique first data block as an eviction candidate.

Further in this example, if new digest entries arrive at the in-memory dedupe index 132 before dirty digest entries are destaged to the on-disk dedupe index 138, then the storage system 104 applies an eviction policy, such as an LRU (Least Recently Used) policy or an LFU (Least Frequently Used) policy, to remove or evict certain digest entries from the in-memory dedupe index 132 so as to make space for the new digest entries. To increase the number of digest entries relevant to the LRU or LFU policy, the storage system 104 applies the fourth eviction rule to avoid removing or evicting "clean" digest entries previously destaged from the in-memory dedupe index 132. In one embodiment, once the in-memory dedupe index 132 reaches a specified fullness threshold, the storage system 104 can destage dirty digest entries to the on-disk dedupe index 138, and mark the destaged digest entries as "clean." Such digest entries marked as "clean" can subsequently be removed or evicted from the in-memory dedupe index 132, if determined to satisfy the LRU or LFU policy.

In one embodiment, the storage system 104 can determine a target number of eviction candidates for the on-disk dedupe index 138 based on certain criteria, such as (i) a maximum number of digest entries that the on-disk dedupe index 138 can accommodate, (ii) a current number of digest entries in the on-disk dedupe index 138, (iii) a number of digest entries to be destaged from the in-memory dedupe index 132, (iv) a number of digest entries for datasets (e.g., data blocks) pointed to by virtual pointers whose associated reference counts have been updated, and/or any other suitable criteria. In this example, the storage system 104 applies the first eviction rule (i.e., avoiding deleting or evicting digest entries for datasets pointed to by virtual pointers with the infinite reference count), and/or the fourth eviction rule (i.e., avoiding deleting or evicting "clean" digest entries previously destaged from the in-memory dedupe index). Further, the storage system 104 identifies digest entries as eviction candidates based on the second eviction rule (i.e., digest entries for datasets pointed to by virtual pointers with the maximum reference count), and/or the third eviction rule (i.e., digest entries for unique datasets). For example, when identifying digest entries as eviction candidates, the storage system 104 may perform several iterations over the on-disk dedupe index 138, selecting a random pivot entry and performing a cyclic scan until the random pivot entry is reached again. If the number of identified eviction candidates is less than the target number of eviction candidates, the storage system 104 randomly identifies, as a last resort, one or more additional digest entries of the on-disk dedupe index 138 as eviction candidates so as to obtain the target number of eviction candidates. The storage system 104 then removes or evicts the identified eviction candidates from the on-disk dedupe index 138.

Figure 4:
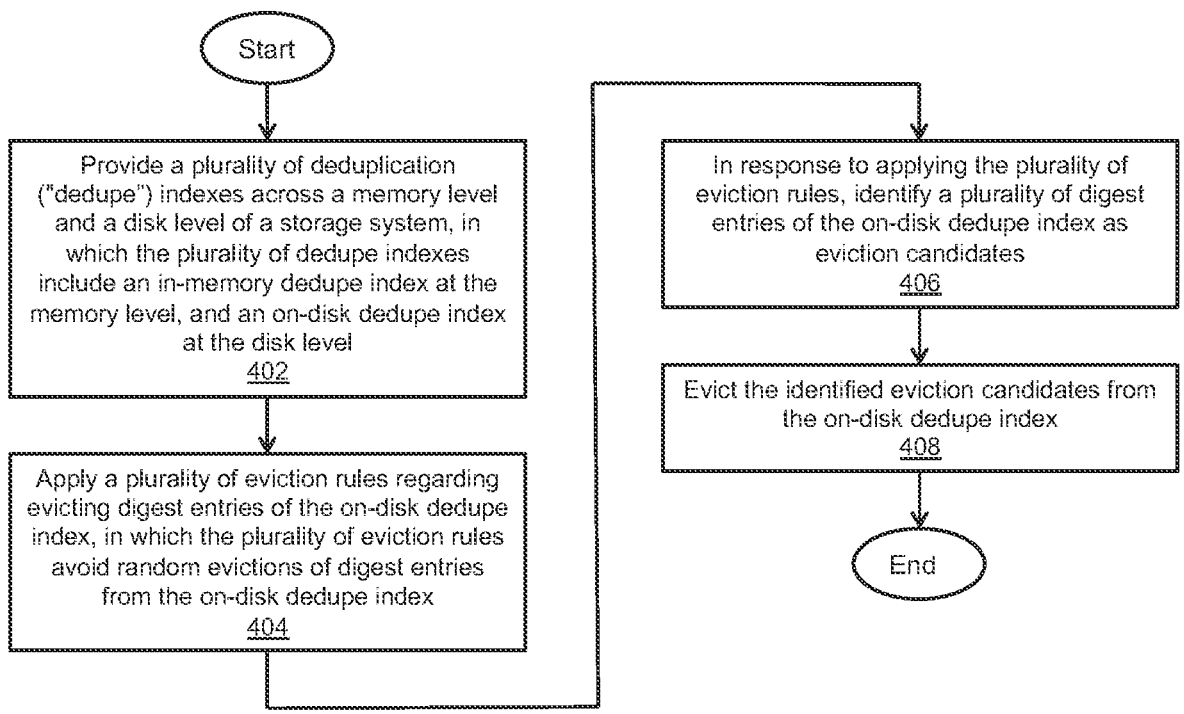
FIG. 4 is a flow diagram of an exemplary method of keeping on-disk, physical dedupe index levels up to date to increase the efficiency of data deduplication in storage systems.

A method of keeping on-disk, physical, dedupe index levels up to date to increase the efficiency of data deduplication in storage systems is described below with reference to FIG. 4. As depicted in block 402, a plurality of deduplication ("dedupe") indexes are provided across a memory level and a disk level of a storage system, in which the plurality of dedupe indexes include an in-memory dedupe index at the memory level, and an on-disk dedupe index at the disk level. As depicted in block 404, a plurality of eviction rules are applied regarding evicting digest entries of the on-disk dedupe index, in which the plurality of eviction rules avoid random evictions of digest entries from the on-disk dedupe index. As depicted in block 406, in response to applying the plurality of eviction rules, a plurality of digest entries of the on-disk dedupe index are identified as eviction candidates. As depicted in block 408, the identified eviction candidates are evicted from the on-disk dedupe index.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" refers to a storage array including multiple storage devices. Such a storage device refers to any non-volatile memory (NVM) device, including hard disk drives (HDDs), solid state drives (SSDs), flash devices (e.g., NAND flash devices, NOR flash devices), and/or similar devices that can be accessed locally and/or remotely, such as via a storage area network (SAN).

As employed herein, the term "storage array" refers to a storage system used for block-based, file-based, or other object-based storage. Such a storage array can include, for example, dedicated storage hardware containing HDDs, SSDs, and/or all-flash drives.

As employed herein, the term "storage entity" refers to a filesystem, an object storage, a virtualized device, a logical unit (LU), a logical volume (VOL), a logical device, a physical device, and/or a storage medium.

As employed herein, the term "LU" refers to a logical entity provided by a storage system for accessing data from the storage system, and can be used interchangeably with a logical volume (VOL). The term "LU" also refers to a logical unit number for identifying a logical unit, a virtual disk, or a virtual LUN.

As employed herein, the term "physical storage unit" refers to a physical entity such as a storage drive or disk, or an array of storage drives or disks, for storing data in storage locations accessible at addresses. The term "physical storage unit" can be used interchangeably with the term "physical volume."

As employed herein, the term "storage medium" refers to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" can also refer to a computer-readable program medium.

As employed herein, the term "IO request" or "IO" refers to a data input or output request such as a read request or a write request.

As employed herein, the terms, "such as," "for example," "e.g.," "exemplary," and variants thereof refer to non-limiting embodiments, and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments, and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
providing a plurality of deduplication ("dedupe") indexes across a memory level and a disk level of a storage system, the plurality of dedupe indexes including an in-memory dedupe index at the memory level, and an on-disk dedupe index at the disk level, the plurality of dedupe indexes for use by the storage system in performing data deduplication operations;
applying a plurality of eviction rules regarding evicting digest entries of the on-disk dedupe index, the plurality of eviction rules avoiding random evictions of digest entries from the on-disk dedupe index;
in response to applying the plurality of eviction rules, identifying a number of digest entries of the on-disk dedupe index as eviction candidates; and
evicting the identified eviction candidates from the on-disk dedupe index,
wherein each of the plurality of dedupe indexes includes a plurality of digest entries, each digest entry including a digest of a stored dataset and a pointer to information pertaining to a location of the stored dataset, and
wherein the applying a plurality of eviction rules includes:
applying a first eviction rule including avoiding removing or evicting digest entries for stored datasets pointed to by virtual pointers having a reference count with a first value greater than a predetermined maximum reference count;
applying a second eviction rule including preferring removing or evicting digest entries for stored datasets pointed to by virtual pointers having the predetermined maximum reference count;

applying a third eviction rule including preferring removing or evicting digest entries for stored datasets deemed non-deduplicable; and applying a fourth eviction rule including avoiding removing or evicting "clean" digest entries previously destaged from the in-memory dedupe index.

2. The method of claim 1 wherein the applying a first eviction rule includes, in response to a reference count of a virtual pointer being updated to the first value greater than the predetermined maximum reference count from a second value less than the first value, adding a corresponding "dirty" digest entry to the in-memory dedupe index, the corresponding dirty digest entry not being previously destaged to the on-disk dedupe index.

3. The method of claim 1 wherein the applying a second eviction rule includes preferring removing or evicting, from the in-memory dedupe index, digest entries for stored datasets pointed to by virtual pointers having the predetermined maximum reference.

4. The method of claim 3 further comprising:
logging updates to digest entries of the in-memory dedupe index in a dedupe log, and
wherein the applying a second eviction rule includes preferring removing or evicting, from the on-disk dedupe index, digest entries for stored datasets pointed to by virtual pointers having the predetermined maximum reference count, using the logged updates in the dedupe log.

5. The method of claim 1 wherein each digest entry includes a binary indication of whether the stored dataset is deduplicable or non-deduplicable, and wherein the applying a third eviction rule includes determining that a stored dataset is deemed non-deduplicable based on the binary indication.

6. The method of claim 5 wherein the applying a third eviction rule includes avoiding destaging the stored dataset deemed non-deduplicable to the on-disk dedupe index.

7. The method of claim 5 wherein the determining that a stored dataset is deemed non-deduplicable includes determining that a corresponding digest entry is a clean digest entry previously destaged to the on-disk dedupe index, and avoiding updating the binary indication of the clean digest entry.

8. The method of claim 1 further comprising:
determining a target number of the eviction candidates based on one or more of a maximum number of digest entries that the on-disk dedupe index can accommodate, a current number of digest entries in the on-disk dedupe index, a number of digest entries to be destaged from the in-memory dedupe index, and a number of digest entries for datasets pointed to by virtual pointers whose reference counts have been updated.

9. The method of claim 8 further comprising:
determining that the number of digest entries of the on-disk dedupe index identified as eviction candidates does not meet the target number of the eviction candidates; and
repeating applying at least the second eviction rule and the third eviction rule.

10. The method of claim 8 further comprising:
determining that the number of digest entries of the on-disk dedupe index identified as eviction candidates meets the target number of the eviction candidates; and
having evicted the identified eviction candidates from the on-disk dedupe index, destaging digest entries from the in-memory dedupe index to the on-disk dedupe index.

11. A system comprising:
a memory; and
processing circuitry configured to execute program instructions out of the memory to:
provide a plurality of deduplication ("dedupe") indexes across a memory level and a disk level of the system, the plurality of dedupe indexes including an in-memory dedupe index at the memory level, and an on-disk dedupe index at the disk level, the plurality of dedupe indexes for use in performing data deduplication operations;
apply a plurality of eviction rules regarding evicting digest entries of the on-disk dedupe index, the plurality of eviction rules avoiding random evictions of digest entries from the on-disk dedupe index;
in response to applying the plurality of eviction rules, identify a number of digest entries of the on-disk dedupe index as eviction candidates; and
evict the identified eviction candidates from the on-disk dedupe index,
wherein each of the plurality of dedupe indexes includes a plurality of digest entries, each digest entry including a digest of a stored dataset and a pointer to information pertaining to a location of the stored dataset, and
wherein the processing circuitry is configured to execute the program instructions out of the memory to:
apply a first eviction rule including avoiding removing or evicting digest entries for stored datasets pointed to by virtual pointers having a reference count with a first value greater than a predetermined maximum reference count;
apply a second eviction rule including preferring removing or evicting digest entries for stored datasets pointed to by virtual pointers having the predetermined maximum reference count;
apply a third eviction rule including preferring removing or evicting digest entries for stored datasets deemed non-deduplicable; and
apply a fourth eviction rule including avoiding removing or evicting "clean" digest entries previously destaged from the in-memory dedupe index.

12. The system of claim 11 wherein the processing circuitry is configured to execute the program instructions out of the memory, in response to a reference count of a virtual pointer being updated to the first value greater than the predetermined maximum reference count from a second value less than the first value, to add a corresponding "dirty" digest entry to the in-memory dedupe index, the corresponding dirty digest entry not being previously destaged to the on-disk dedupe index.

13. The system of claim 11 wherein the processing circuitry is configured to execute the program instructions out of the memory to prefer removing or evicting, from the in-memory dedupe index, digest entries for stored datasets pointed to by virtual pointers having the predetermined maximum reference count.

14. The system of claim 13 wherein the processing circuitry is configured to execute the program instructions out of the memory to:
log updates to digest entries of the in-memory dedupe index in a dedupe log, and
prefer removing or evicting, from the on-disk dedupe index, digest entries for stored datasets pointed to by virtual pointers having the predetermined maximum reference count, using the logged updates in the dedupe log.

15. The system of claim 11 wherein each digest entry includes a binary indication of whether the stored dataset is deduplicable or non-deduplicable, and wherein the processing circuitry is configured to execute the program instructions out of the memory to determine that a stored dataset is deemed non-deduplicable based on the binary indication.

16. The system of claim 15 wherein the processing circuitry is configured to execute the program instructions out of the memory to avoid destaging the stored dataset deemed non-deduplicable to the on-disk dedupe index.

17. The system of claim 15 wherein the processing circuitry is configured to execute the program instructions out of the memory to:
    determine that a corresponding digest entry is a clean digest entry previously destaged to the on-disk dedupe index; and
    avoid updating the binary indication of the clean digest entry.

18. A computer program product including a set of non-transitory, computer-readable media having instructions that, when executed by processing circuitry, cause the processing circuitry to perform a method comprising:
    providing a plurality of deduplication ("dedupe") indexes across a memory level and a disk level of a storage system, the plurality of dedupe indexes including an in-memory dedupe index at the memory level, and an on-disk dedupe index at the disk level, the plurality of dedupe indexes for use by the storage system in performing data deduplication operations;
    applying a plurality of eviction rules regarding evicting digest entries of the on-disk dedupe index, the plurality of eviction rules avoiding random evictions of digest entries from the on-disk dedupe index;
    in response to applying the plurality of eviction rules, identifying a number of digest entries of the on-disk dedupe index as eviction candidates; and
    evicting the identified eviction candidates from the on-disk dedupe index,
    wherein each of the plurality of dedupe indexes includes a plurality of digest entries, each digest entry including a digest of a stored dataset and a pointer to information pertaining to a location of the stored dataset, and
    wherein the applying a plurality of eviction rules includes:
        applying a first eviction rule including avoiding removing or evicting digest entries for stored datasets pointed to by virtual pointers having a reference count with a first value greater than a predetermined maximum reference count;
        applying a second eviction rule including preferring removing or evicting digest entries for stored datasets pointed to by virtual pointers having the predetermined maximum reference count;
        applying a third eviction rule including preferring removing or evicting digest entries for stored datasets deemed non-deduplicable; and
        applying a fourth eviction rule including avoiding removing or evicting "clean" digest entries previously destaged from the in-memory dedupe index.

* * * * *